United States Patent
Larrain et al.

(10) Patent No.: US 11,295,394 B2
(45) Date of Patent: Apr. 5, 2022

(54) METHOD AND SYSTEM FOR CREDIT CARD HOLDER IDENTIFICATION

(75) Inventors: Francisco Larrain, Palo Alto, CA (US); Evan Macmillan, San Francisco, CA (US); Gaston L'Huillier, Fremont, CA (US); Ricardo Zilleruelo, Sunnyvale, CA (US)

(73) Assignee: Groupon, Inc., Chicago, IL (US)

( * ) Notice: Subject to any disclaimer, the term of this patent is extended or adjusted under 35 U.S.C. 154(b) by 849 days.

(21) Appl. No.: 13/991,807

(22) PCT Filed: Dec. 7, 2011

(86) PCT No.: PCT/US2011/063823
§ 371 (c)(1),
(2), (4) Date: Jan. 15, 2014

(87) PCT Pub. No.: WO2012/078810
PCT Pub. Date: Jun. 14, 2012

(65) Prior Publication Data
US 2014/0122171 A1    May 1, 2014

Related U.S. Application Data

(60) Provisional application No. 61/459,157, filed on Dec. 7, 2010.

(51) Int. Cl.
*G06Q 40/00* (2012.01)
*G06Q 20/34* (2012.01)

(52) U.S. Cl.
CPC ............ *G06Q 40/12* (2013.12); *G06Q 20/34* (2013.01)

(58) Field of Classification Search
CPC .............................. G06Q 20/40; G06Q 40/12
See application file for complete search history.

(56) References Cited

U.S. PATENT DOCUMENTS

| 2,950,048 A | 8/1960 | Luhn | |
|---|---|---|---|
| 5,715,399 A * | 2/1998 | Bezos | G06Q 20/04 235/380 |
| 6,070,154 A | 5/2000 | Tavor et al. | |

(Continued)

OTHER PUBLICATIONS

Graham Roberts-Phelps, "customer Relationship Management How to turn a good business into a great one!", Thorogood, 2003.*

(Continued)

*Primary Examiner* — Pan G Choy
(74) *Attorney, Agent, or Firm* — Alston & Bird LLP

(57) ABSTRACT

The present invention is associated with a computerized system that takes a subsequence of a credit card number, in particular the suffix (or last n digits), and transaction data associated with the cardholder. For each subsequence of the credit card number, a set of data may be used in order to uniquely identify the cardholder. The identification of the cardholder may be performed in a particular search space that is composed of all possible credit card numbers and includes the transaction data associated with the cardholder. In an exemplary embodiment, the computerized system is used to promote engagements between individual cardholders and merchants by effectuating marketing actions in combination with commercial transactions when products or subscriptions are purchased.

16 Claims, 5 Drawing Sheets

(56) References Cited

U.S. PATENT DOCUMENTS

| | | | | |
|---|---|---|---|---|
| 6,128,599 A * | 10/2000 | Walker | G06Q 20/10 | 235/380 |
| 6,163,771 A * | 12/2000 | Walker | G06Q 20/04 | 705/18 |
| 6,330,544 B1 * | 12/2001 | Walker | G06Q 20/20 | 705/35 |
| 7,617,532 B1 * | 11/2009 | Alexander | G06F 21/554 | 713/154 |
| 8,485,442 B2 * | 7/2013 | McNeal | G06Q 20/40145 | 235/382 |
| 8,805,737 B1 * | 8/2014 | Chen | G06Q 40/02 | 705/35 |
| 9,881,298 B2 * | 1/2018 | Flitcroft | G06Q 40/04 | |
| 2001/0034702 A1 | 10/2001 | Mockett et al. | | |
| 2001/0047335 A1 | 11/2001 | Arndt et al. | | |
| 2003/0028481 A1 * | 2/2003 | Flitcroft | G06Q 20/04 | 705/39 |
| 2003/0097320 A1 * | 5/2003 | Gordon | G06Q 40/00 | 705/35 |
| 2004/0010458 A1 * | 1/2004 | Friedman | G06Q 40/00 | 705/35 |
| 2004/0039919 A1 * | 2/2004 | Takayama | G06Q 20/04 | 713/180 |
| 2005/0246181 A1 * | 11/2005 | Kawahara | G06Q 40/00 | 705/35 |
| 2006/0218098 A1 * | 9/2006 | Walker | G06Q 20/04 | 705/50 |
| 2007/0103993 A1 * | 5/2007 | Mount | G06Q 30/02 | 365/189.05 |
| 2008/0164308 A1 * | 7/2008 | Aaron | G06Q 20/34 | 235/380 |
| 2009/0144213 A1 * | 6/2009 | Patil | G06N 3/126 | 706/46 |
| 2009/0171955 A1 * | 7/2009 | Merz | G06F 16/24558 | |
| 2009/0173782 A1 | 7/2009 | Muscato | | |
| 2009/0210368 A1 * | 8/2009 | Deo | G06K 9/6267 | 706/20 |
| 2009/0216666 A1 * | 8/2009 | Antao | G06Q 10/10 | 705/30 |
| 2009/0248434 A1 * | 10/2009 | Pfeffer | G06Q 20/3224 | 705/346 |
| 2010/0287099 A1 * | 11/2010 | Liu | G06Q 20/4016 | 705/44 |
| 2011/0022521 A1 * | 1/2011 | Collinge | G06Q 20/04 | 705/67 |
| 2011/0029657 A1 * | 2/2011 | Gueta | H04L 43/028 | 709/224 |
| 2011/0035292 A1 * | 2/2011 | Boesel | G06Q 30/06 | 705/26.3 |
| 2011/0302155 A1 * | 12/2011 | Yan | G06F 17/30867 | 707/723 |
| 2012/0205443 A1 * | 8/2012 | Routhenstein | G06Q 20/3415 | 235/380 |

OTHER PUBLICATIONS

"Understand Consumer Tempo to Improve Marketing Results", by Mollie Cameron and Leigh Nichols, 2008 First Data Corporation. (Year: 2008).*

"Hashing Credit Card Numbers: Unsafe Application Practices", by Stephen Kost, Integrigy Corporation, Feb. 27, 2007 (Year: 2007).*

"Use of Abstract Categories in Data Clustering Algorithms", by George Robert Mikulski, Graduate School of Computer and Information Sciences Nova Southeastern University, 2008. (Year: 2008).*

International Search Report and Written Opinion for Application No. PCT/US2011/063823 dated Apr. 9, 2012.

* cited by examiner

METHOD AND SYSTEM FOR CREDIT CARD HOLDER IDENTIFICATION

CROSS REFERENCE TO RELATED APPLICATIONS

This application is a national phase entry of International Application No. PCT/US2011/063823, filed Dec. 7, 2011, which claims priority to U.S. Provisional Patent Application No. 61/459,157, filed Dec. 7, 2010, which are incorporated herein by reference in their entirety.

BACKGROUND

The present disclosure is directed generally to a method and system for credit card holder identification and more particularly to a method and system for credit card holder identification using a portion of the credit card holder's credit card number.

BRIEF SUMMARY

A method for credit card holder identification using a portion of the credit card holder's credit card number is set forth herein. Also described is a system configured to identify a credit card holder using a portion of the credit card holder's credit card number.

DETAILED DESCRIPTION

Figure 1:
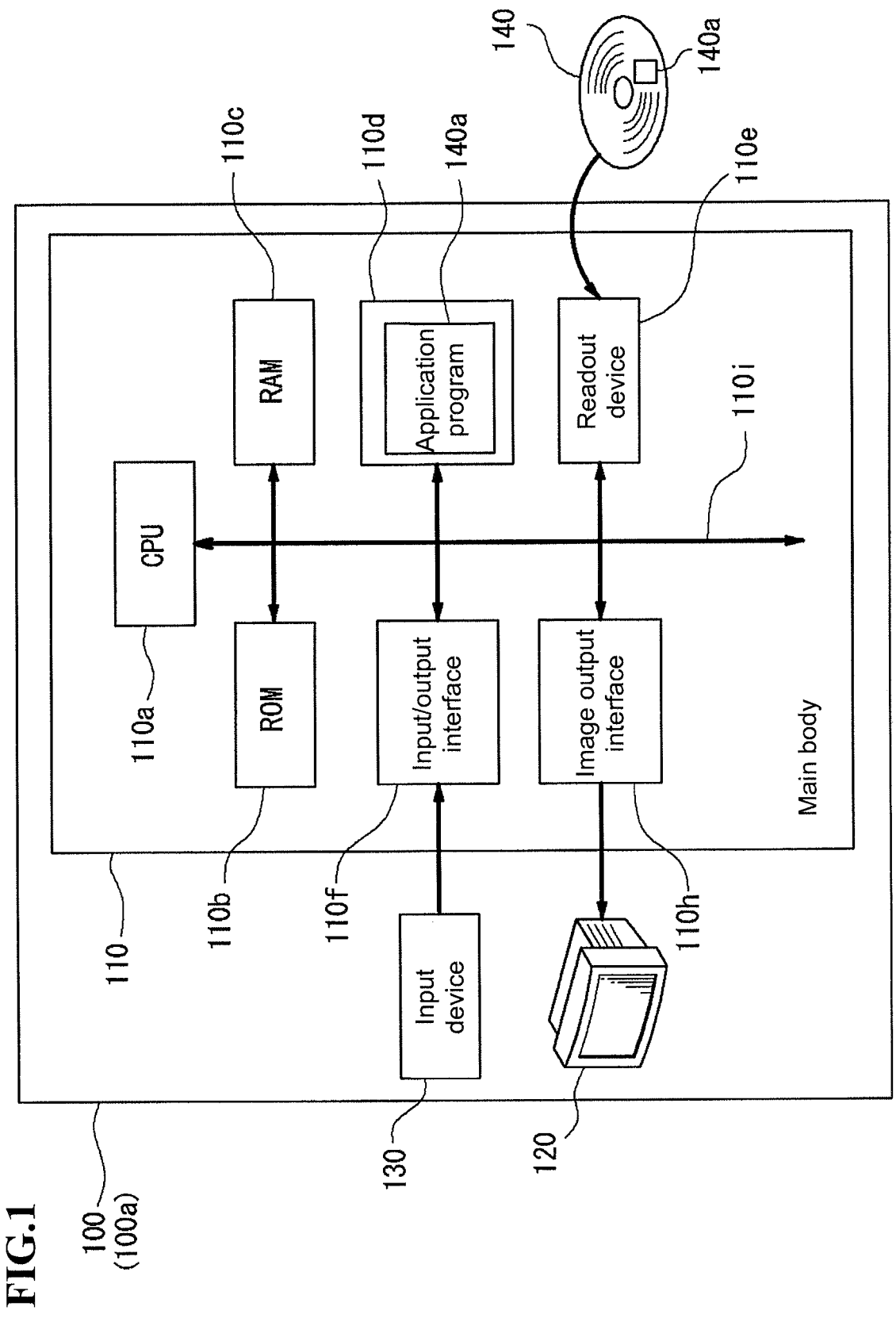
FIG. 1 illustrates an exemplary computer system for implementing certain methods for credit card holder identification in accordance with the teachings of the present disclosure.

FIG. 1 is a block diagram showing an embodiment of a computer system 100 that may be used to implement methods for credit card holder identification in accordance with the teachings of the present disclosure. One or more computer systems 100 may carry out the methods presented herein as computer programs. The term "computer program" includes, for example, code, instructions, signals and/or data.

The system 100 is composed of a computer 100a primarily comprising a main body 110, a display 120, and an input device 130. The main body 110 comprises a CPU 110a, a ROM 110b, a RAM 110c, a hard disk 110d, a readout device 110e, an input/output interface 110f, and an image output interface 110h. The CPU 110a, the ROM 110b, the RAM 110c, the hard disk 110d, the readout device 110e, the input/output interface 110f, and the image output interface 110h are data-communicably connected by a bus 110i.

The CPU 110a is capable of executing a computer program recorded in the ROM 110b and/or a computer program loaded in the RAM 110c.

The ROM 110b comprises mask ROM, PROM, EPROM, EEPROM, etc., and is recorded with computer programs executed by the CPU 110a and data used for the programs.

The RAM 110c comprises SRAM, DRAM, etc. The RAM 110c is used to read out computer programs recorded in the ROM 110b and the hard disk 110d, and is used as a work area of the CPU 110a when these computer programs are executed.

The hard disk 110d is installed with an operating system, various computer programs to be executed by the CPU 110a, and data used for executing the computer programs.

The readout device 110e which comprises a flexible disk drive, a CD-ROM drive or DVD-ROM drive is capable of reading out a computer program or data recorded in a portable recording media 140. The portable recording media 140 stores the computer program, i.e., the application program 140a, to function as a system of the present disclosure. The computer reads out the application program 140a related to the present disclosure from the portable recording media 140 and is capable of installing the application program 140a in the hard disk 110d.

In addition to that said application program 140a is provided by the portable recording media 140, said application program 140a may be provided through an electric communication line (wired or wireless) from outside devices which are communicably connected to the computer via said electric communication line and a communications interface. For example, said application program 140a is stored in a hard disk in an application program providing server computer on the Internet to which the computer accesses and said application program 140a may be downloaded and installed in the hard disk 110d.

The hard disk 110d is installed with an operating system, such as an operating system which provides a graphical user interface environment, e.g. Microsoft Windows manufactured by Microsoft Corp. of Redmond, Wash. In the explanation hereinafter, the application program 140a related to this embodiment shall operate on said operating system.

The input/output interface 110f comprises a serial interface, e.g. USB, IEEE1394, RS-232C, etc.; a parallel interface, e.g. SCSI, IDE, IEEE1284, etc.; and an analog interface, e.g. D/A converter, A/D converter, etc. The input/output interface 110f is connected to the input device 130 comprising a keyboard and a mouse and users capable of inputting data into the computer using the input data device 130.

The image output interface 110h is connected to the display 120 comprising LCD, CRT or the like so that picture signals corresponding to image data provided from the CPU 110a are output to the display 120. The display 120 displays a picture (screen) based on input picture signals.

The present disclosure is also directed to computer products, otherwise referred to as computer program products, to provide software that includes computer code to the computer system 100. The CPU 110a executes the computer code in order to implement the methods of the present disclosure and to provide the functionality described herein. As an example, the methods according to the present disclosure may be implemented using software that includes the computer code, wherein the software is loaded into the computer system 100 using a memory (e.g., ROM 110b, RAM 110c), a mass storage device (e.g., hard disk 110d, readout device 110e), or through an interface (e.g., I/O interface 110f, a communications interface) with the computer system 110. The computer code in conjunction with the computer system 110 described herein may perform any one of, or any combination of, the steps of any of the methods presented herein. It is also contemplated that the methods according to the present disclosure may be performed automatically, or may be invoked by some form of manual intervention.

The computer system 100 of FIG. 1 is provided only for purposes of illustration, such that the present disclosure is not limited to this specific embodiment. It is appreciated that a person skilled in the relevant art knows how to program and implement the methods according to the present disclosure using any suitable computer system or network architecture.

Figure 2:
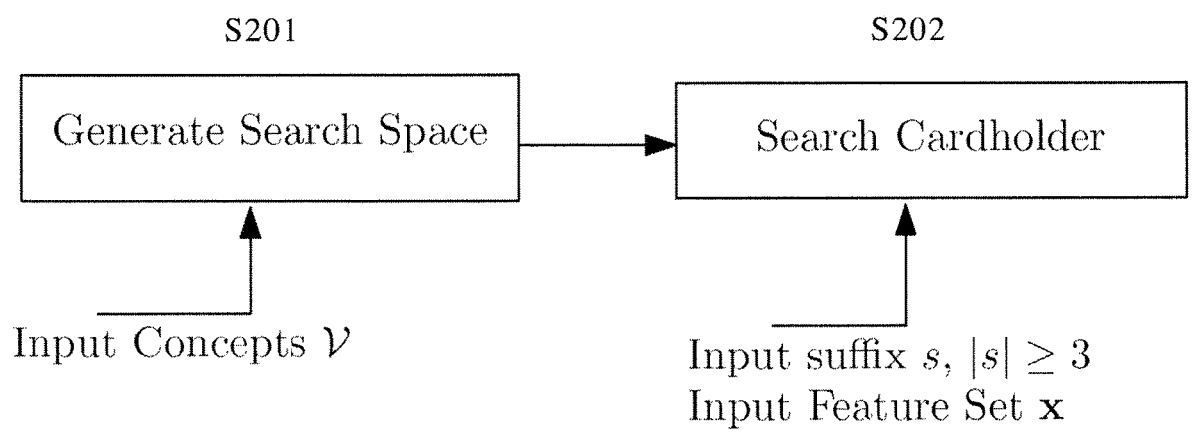
FIG. 2 illustrates a method for credit card holder identification in accordance with the teachings of the present disclosure.

FIG. 2 illustrates a method 200 for credit card holder identification in accordance with the teachings of the present disclosure. The method 200, for example, allows a third party to identify or locate a cardholder (i.e., credit card holder) and associated information using a variable-length suffix of the cardholder's credit card number. In one embodiment, it may be assumed that if the credit card number is from a partial or virtual card, there will be no reason to retrieve its associated information. Such cards are used for single-transaction accounts that do not contain multiple transactional records that occur over time.

As described in greater detail hereinafter, for each subsequence of the credit card number, a set of data may be used in order to uniquely identify the cardholder. The identification of the cardholder may be performed in a particular search space that is composed of all possible credit card numbers and includes extra information about the cardholder.

Figure 3:
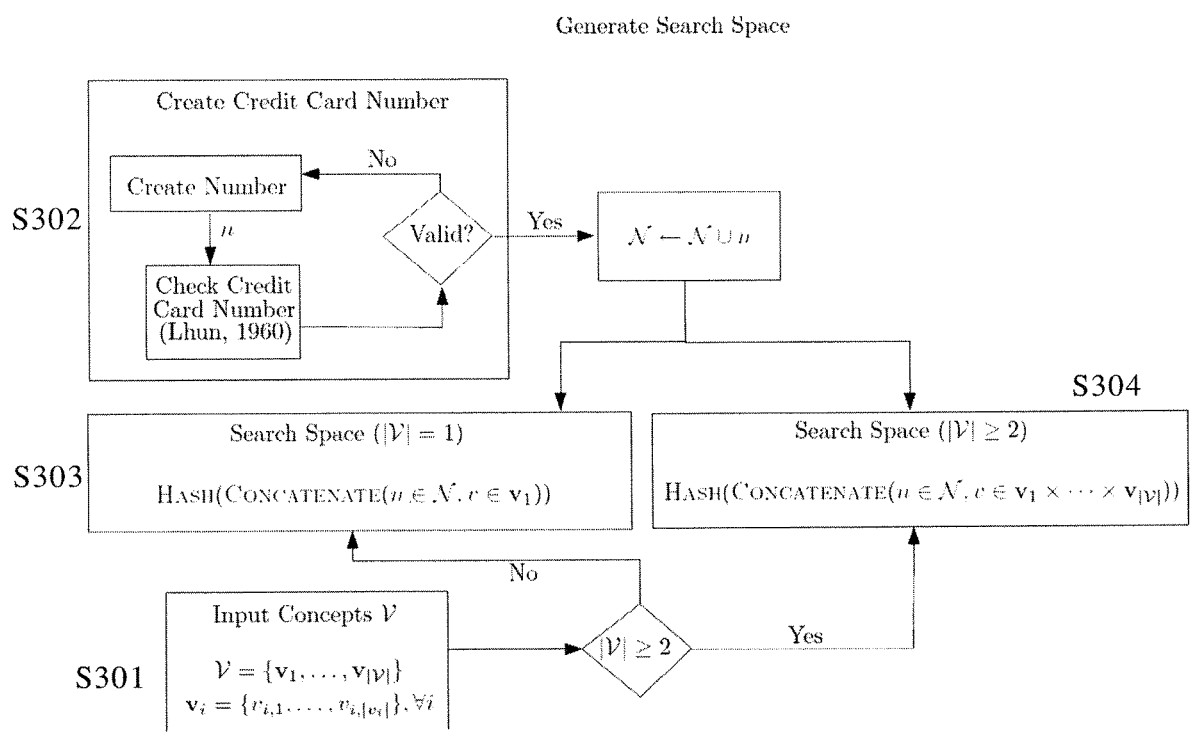
FIG. 3 illustrates an algorithm for generating a search space in accordance with the teachings of the present disclosure.

Preferably, transaction data for cardholders can be gathered from various sources (including merchant processors, acquiring banks, issuing banks and retailers direct feeds and credit card networks) using different data collection mechanisms. In one embodiment, it will be assumed that some of the information related to cardholders, such as the start date, end date, registration date, birthdate, name on card, first activity date, last activity date, card type, address, city, state, zip code, and country code, will be used consistently as input information or concepts together with a variable length suffix of the credit card number. The method 200 of FIG. 2 is based on two steps. First, in Step S201, the system 100 generates a search space according to all of possible solutions for credit cards. Step S201 may approximate the search using dimensionality reduction and hashing collision techniques within the overall space of candidate credit cards. Step S201 is described in the following algorithms, Algorithm 1 and Algorithm 2, which are illustrated in FIG. 3.

Algorithm 1:

In Step 301, the system 100 receives or retrieves as input a list of all possible values for a given concept or set of concepts. In one embodiment, the given concept or set of concepts corresponds to the concepts included in the transaction data for cardholders that is gathered from merchant processors, acquiring banks, issuing banks, retailers direct feeds, credit card and other various sources.

In Step 302, the system 100 builds all valid credit card numbers combinations. Credit card numbers can be computed using a brute force algorithm, validating at each step the checksum of the credit card number by the Lhun's (mod 10) formula (see Algorithm 2).

In Step 303, if the number of concepts is 1, the system 100 concatenates all possible concept values with all previously computed credit card numbers to create a set of key values, and stores them in a hash table. In particular, the key values are used to determine the indices of the hash table using a suitable hashing function. Concept values may be used as a salt in the evaluation of the suitable hashing function.

In Step 304, if the number of concepts is greater of equal than 2, the system 100 concatenates all possible concept values, and combination of these values, with each valid credit card number to create a set of key values. Then, the system 100 assigns these key values to the hash table using an appropriate hashing function. In one embodiment, an algorithm such as SHA-2 or HMAC-SHA-2 may be used to map the previous sequences to the hash table data structure so as to reduce hash collision problems. In this way, Algorithm 1 generates as output a hash table with a credit card number search space.

Algorithm 2, as described by (Lhun, 1960):

In algorithm 2, a credit card number is input and a Boolean v is output. If the credit card number has an even number of digits (e.g. 16), then the system 100 doubles every odd numbered digit and subtracts 9 if the product is greater than 9. The system 100 then adds up all the even digits as well as the doubled-odd digits. If result.mod(10)=0, v=true else v=false. Otherwise, if the card number has an odd number of digits (e.g. 15), the system 100 performs the same process described above, except that it doubles the even numbered digits instead of the odd number digits.

As a result of Algorithm 1, a data structure is built with all possible credit card numbers to allow future search queries by new input data. This structure will be used to assign incoming credit card number values with captured accounts. Then, the resulting number of the hashing function can be used as the identifier of further applications that may derived from this method.

Figure 4:
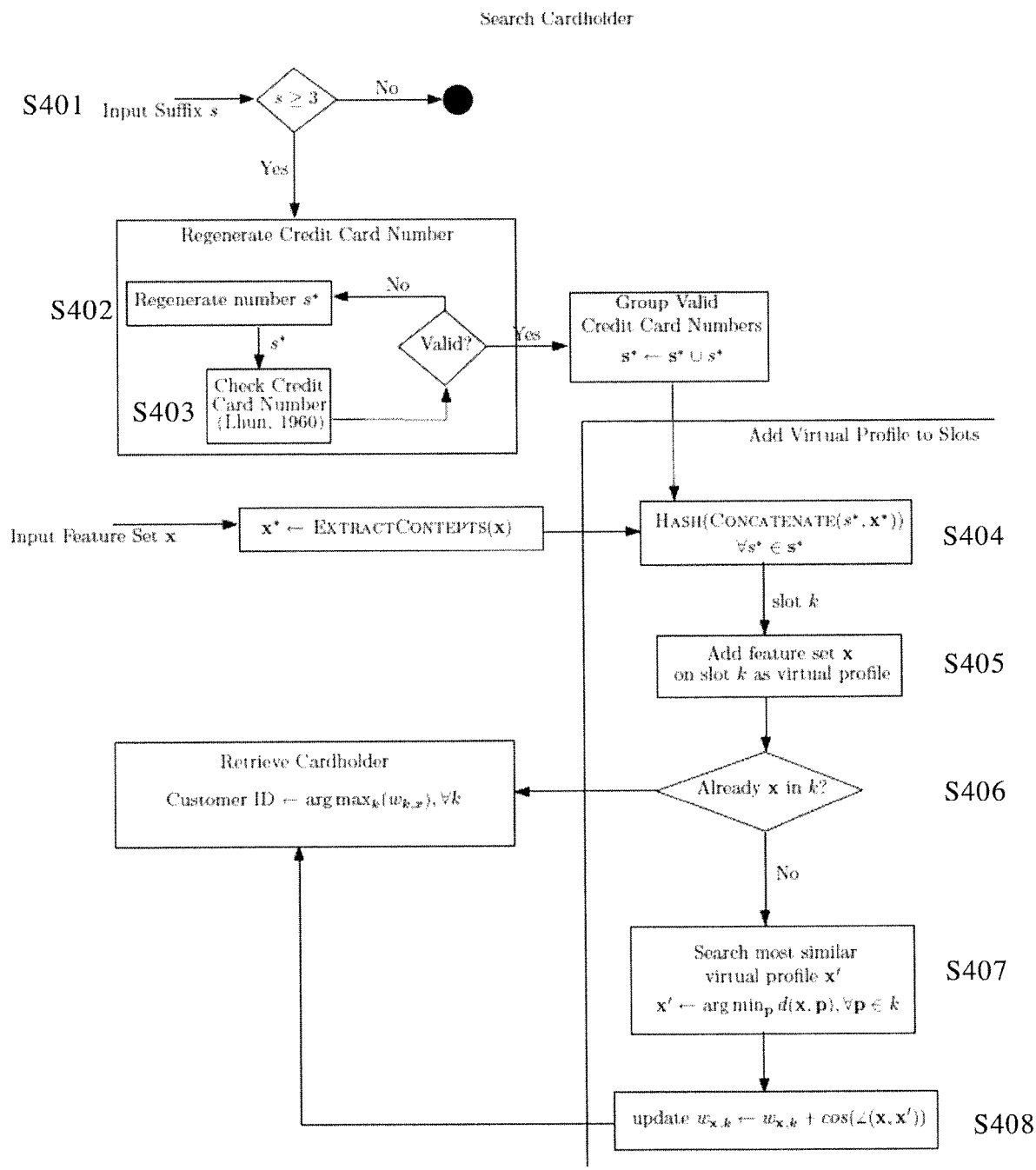
FIG. 4 illustrates an algorithm for searching for a credit card holder in a search space in accordance with the teachings of the present disclosure.

Once the search space is built, the method 200 leads to Step S202. In Step S202, the system determines which cardholder could be the owner of a given subsequence of a credit card number using pattern recognition techniques. This Step S202 may include identifying the original credit card number in the previous data structure using as an input all possible data: variable length suffix of the credit card number, email, start date, end date, registration date, birthdate, name on card, first activity date, last activity date, card type, address, city, state, zip code, and country code. This search Step S202 is described in the following Algorithm 3, which is illustrated in FIG. 4.

Algorithm 3:

In Step 401, the system 100 receives or retrieves as input a suffix with s numbers, where the value of s is greater than or equal to 3, and a feature set x with information of the prospective cardholder.

In Step 402, given the last n−1 digits of the suffix of the prospective cardholder, the system 100 builds all possible 16 digits credit card number using the nth digit from the subsequence as a checksum to validate whether the complete sequence is valid or not. If the type of card and/or issuer are known through the card type input information, the amount of possible credit card number diminishes dramatically. (In most cases, the first number corresponds to the major industry identifier, and the 6 following numbers are considered as the issuer identifier). Then, all possible values are generated by considering the 7th digit to the (15−n)th digit as the last digit is the checksum identifier.

In Step 403, the system 100 reduces the amount of potential credit card numbers by validating previous set of numbers with Luhn's (mod 10) algorithm (Algorithm 2).

In Step 404, the system 100 extracts all concepts previously used to create the search space from the inputted feature set x. Then, the system 100 concatenates the values of the extracted concepts with all re-generated credit card numbers. When applying the hash function, this generates a unique number that will be associated to the respective credit card holder data in the following step of the algorithm.

In Step 405, the system 100, using as a search space all credit card numbers with concepts in algorithm 1, adds to all possible slots of the hash table associated with the unique number a virtual profile for the prospective cardholder. The concept of a slot is related to the values generated by the hashing function when the search space was built. Every slot is associated to one combination of the values for the generated valid credit card numbers, and the possible values for the concepts available to build the search space. On each slot, all related cardholder profiles (i.e., profiles with the same information for both the credit card number suffix and the concepts) will be stored with an identifying number or ID (e.g., a combination of all available features) and a weight value which is set as zero (0) when a given feature vector x is added for the first time, and will be updated in further steps of the algorithm.

In addition, when further transaction data or information on real credit cards is available, there is a possibility to reduce the search space, focusing on the indexes (hash between credit card number and concepts) associated to data which is most likely to belong to a real user. In this sense, when information about cardholders is used to search for the unique link between the end user and the credit card suffix, the mapping could be prioritized towards the slots which are associated to real transactions. To facilitate the access to the labeled slots, their respective indexes could be stored in a separate hash data structure.

In Step 406, if the input feature set x was already in slot k, then the system 100 retrieves the customer ID.

If the input feature set x was not already in slot k, then the system 100 searches for the most similar virtual profile x' using input feature set x in Step 407 and updates the weight of input feature set x on slot k using a similarity measure in Step 408. When searching for the most similar profile for a given input feature vector x, the similarity function (which may be represented by the cosine function between the angle of two vectors) will update the input vector weights using as reference the closest vector in the slot (using a distance function d). Furthermore, without loss of generality, it is relevant to point out that other similarity functions could be used with the same purpose, such as kernel methods, probabilities, and further elements from measure theory.

In Step 409. the system 100 retrieves the customer ID searching for the slot with the higher weight with respect to input feature set x. In this way, Algorithm 3 generates as output a hash number (Customer ID) for the closest matching credit cardholder.

In one embodiment, cardholders can be enrolled in a given information system that accepts cardholder information along with a subsequence of the cardholder's credit card number. This input process facilitates the storage of new information and the execution of complex queries of the information system. This information system consists of a database that is built to update the profile data for a given suffix of the credit card number and an authentication gateway.

If a given cardholder is enrolled and the associated transactional data is gathered by a given information system, the search Step S2 can be enhanced by reducing the search space with all available information. At all times, a profile for the cardholder can be computed, which describes a unique buying fingerprint. This profile can be computed using transactional data (e.g. amount of purchase, merchant, number of items, time since last purchase, etc.), which can be stored together with the hashing representation of its credit card number with the concepts such as the respective email, start date, end date, registration date, birthdate, name on card, first activity date, last activity date, card type, address, city, state, zip code, and country code.

When a cardholder is enrolled and the first transaction settles, the major industry identifier and the issuer identifier (first 7 digits) of the credit card can be stored. This information can be added to the buying fingerprint of a given user to make further enhancements in the search for the user's data, given the suffix of n digits originated from a given credit card number.

Figure 5:
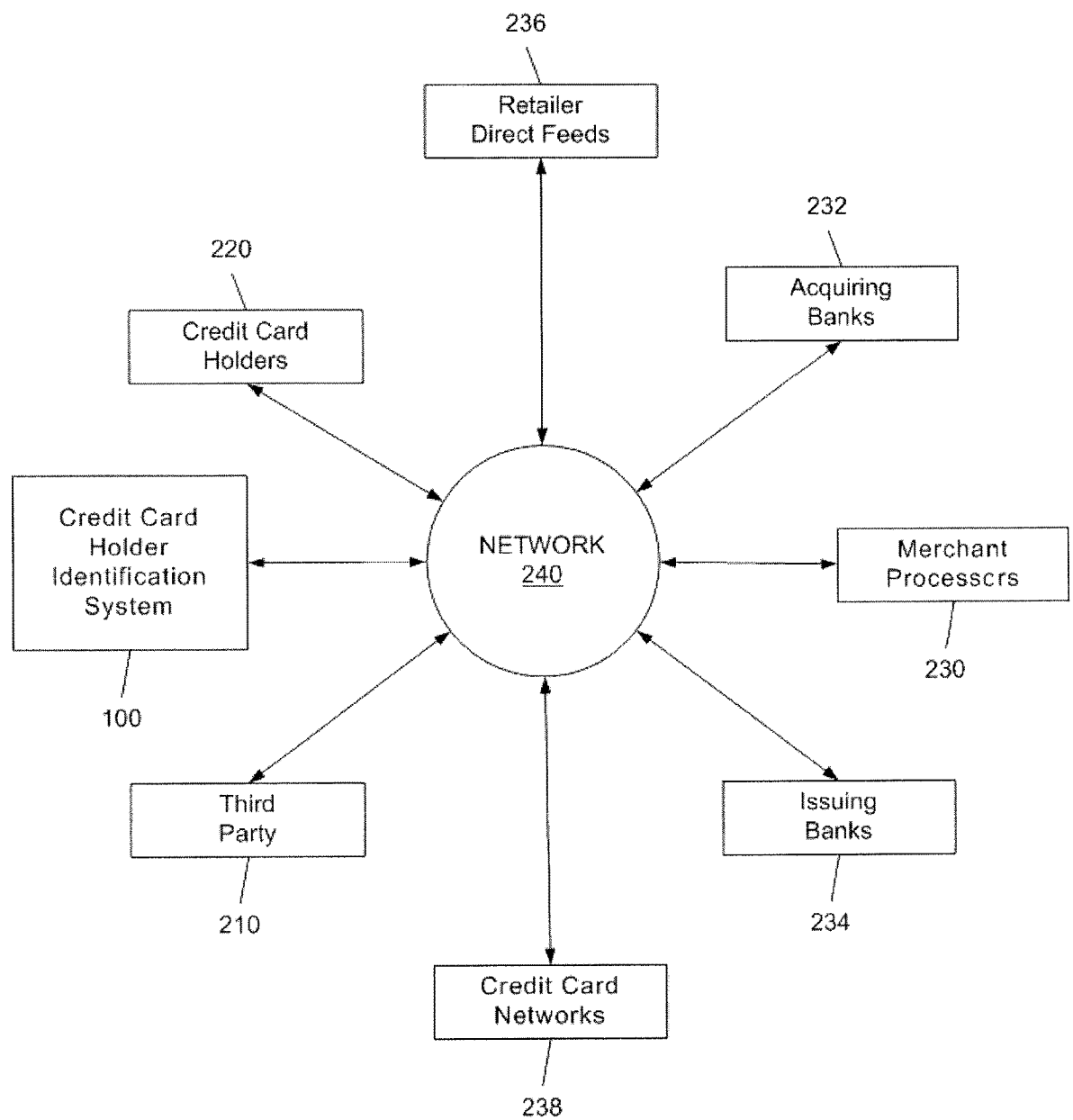
FIG. 5 illustrates an exemplary public network architecture for implementing a credit card holder identification system.

FIG. 5 shows one of many possible network architectures 500 that may be used to implement methods for credit card holder identification in accordance with the teachings of the present disclosure. The system 100 (illustrated in exemplary detail in FIG. 1) may connect to a network 510 that is in further communication with third parties' computer systems attempting to identify or locate a cardholder using the system 100. The third parties' computer systems may be located at and/or associated with merchant processors 230, acquiring banks 232, issuing banks 234, retailers' direct feeds 236, and credit card networks 238. The system 100 may also communicate with computer systems associated with individual credit card holders 220, or other third-party data providers or service vendors 210. In other embodiments, a different computer system may be used instead of computer system 100. The network 510 of the network architecture 500 may be any suitable network such as, for example, a publicly accessible distributed network like the Internet or other telecommunications network.

In another embodiment, there is disclosed a method for separating payment transactional data from payment information data by detecting with an input variable length suffix of a credit card number together with other sources of data, which will be used to store and separate all available transactional data from payment information data.

The transactional data may relate to a commercial transaction. The commercial transaction may relate to a purchase of a product or a purchase of a subscription. In particular, the commercial transaction may relate to purchase of a product from a merchant with all available temporal information, such as temporal information that relates to the frequency of purchases as temporal purchase windows can be extracted from a given customer for a given merchant. Further, the commercial transaction may relate to one or more of the following: churn, client acquisition, up-sell, cross-sell or win-back, or a combination thereof. Also, the commercial transaction may relate to a company or merchant, wherein the commercial transaction further comprises communication with the company or merchant, or changing at least one parameter of the commercial transaction. Also, the payment transactional data may relate to any information contained on a customer or payment card, such as the primary account number, cardholder name, expiration date, and service code.

In addition, the method for separating payment transactional data from payment information data may further comprise determining at least one marketing action associated with a relationship. The marketing action may comprise one or more of the following: increasing brand awareness, churn prevention, client retention, client acquisition, up-sell, cross-sell or win-back, or a combination thereof.

In addition, the method for separating payment transactional data from payment information data may further comprise detecting an explicit or implicit communication with the company or merchant and also determining the relationship according to the explicit or implicit communication. The implicit communication may be performed through the Internet, including email, posting on a web page, posting on a blog, posting on a chat room, visiting a web page or an IM (instant messenger) message. The detection of the explicit or implicit communication may comprise determining an active transmission coefficient for active transfer of information and/or determining an intrinsic transmission coefficient for passive transfer of information. The transaction may have a long decision cycle or a short decision cycle.

In addition, the method for separating payment transactional data from payment information data may further comprise determining a plurality of relationships, constructing a social group from said plurality of relationships, and constructing a social network from the social group. Alternatively, a social network may be constructed from the plurality of relationships. Further, a plurality of social networks may be overlaid to establish a new social network according to a similarity threshold. Also, the method may determine an influence in the relationships, wherein the influence may be active and/or passive, determine a strength of the relationship, and selecting a preferred mode of influence from active or passive according to the strength of said relationship.

In another embodiment, there is disclosed a method for creating a buying fingerprint for customers given a suffix of the credit card number and transactional data by using data clustering strategies, as well as pattern recognition algorithms, in such a manner that customers can be classified and clustered in terms of their transactional data. The pattern recognition algorithms may relate to unsupervised learning, supervised learning, semi-supervised learning, reinforcement learning, association rules learning, Bayesian learning, solving for probabilistic graphical models, or other computational intelligence algorithms which states an interactive process to extract patterns from transactional data.

The transactional data may relate to a commercial transaction. The commercial transaction may relate to a purchase of a product or a purchase of a subscription. In particular, the commercial transaction may relate to purchase of a product from a merchant with all available temporal information, such as temporal information that relates to the frequency of purchases as temporal purchase windows can be extracted from a given customer for a given merchant. Further, the commercial transaction may relate to one or more of the following: churn, client acquisition, up-sell, cross-sell or win-back, or a combination thereof. Also, the commercial transaction may relate to a company or merchant, wherein the commercial transaction further comprises communication with the company or merchant, or changing at least one parameter of the commercial transaction. Also, the payment transactional data may relate to any information contained on a customer or payment card, such as the primary account number, cardholder name, expiration date, and service code.

In addition, the method for creating a buying fingerprint for customers may further comprise determining at least one marketing action associated with a relationship. The marketing action may comprise one or more of the following: increasing brand awareness, churn prevention, client retention, client acquisition, up-sell, cross-sell or win-back, or a combination thereof.

In addition, the method for creating a buying fingerprint for customers may further comprise detecting an explicit or implicit communication with the company or merchant and also determining the relationship according to the explicit or implicit communication. The implicit communication may be performed through the Internet, including email, posting on a web page, posting on a blog, posting on a chat room, visiting a web page or an IM (instant messenger) message. The detection of the explicit or implicit communication may comprise determining an active transmission coefficient for active transfer of information and/or determining an intrinsic transmission coefficient for passive transfer of information. The transaction may have a long decision cycle or a short decision cycle.

In addition, the method for creating a buying fingerprint for customers may further comprise determining a plurality of relationships, constructing a social group from said plurality of relationships, and constructing a social network from the social group. Alternatively, a social network may be constructed from the plurality of relationships. Further, a plurality of social networks may be overlaid to establish a new social network according to a similarity threshold. Also, the method may determine an influence in the relationships, wherein the influence may be active and/or passive, determine a strength of the relationship, and selecting a preferred mode of influence from active or passive according to the strength of said relationship.

In another embodiment, there is disclosed a method for measuring ROI and advertising performance for brands given a suffix of a credit card number, all available transactional data, and all investments performed by a given merchant.

The transactional data may relate to a commercial transaction. The commercial transaction may relate to a purchase of a product or a purchase of a subscription. In particular, the commercial transaction may relate to purchase of a product from a merchant with all available temporal information, such as temporal information that relates to the frequency of purchases as temporal purchase windows can be extracted from a given customer for a given merchant. Further, the commercial transaction may relate to one or more of the following: churn, client acquisition, up-sell, cross-sell or win-back, or a combination thereof. Also, the commercial transaction may relate to a company or merchant, wherein the commercial transaction further comprises communication with the company or merchant, or changing at least one parameter of the commercial transaction. Also, the payment transactional data may relate to any information contained on a customer or payment card, such as the primary account number, cardholder name, expiration date, and service code.

In addition, the method for separating payment transactional data from payment information data may further comprise determining at least one marketing action associated with a relationship. The marketing action may comprise one or more of the following: increasing brand awareness, churn prevention, client retention, client acquisition, up-sell, cross-sell or win-back, or a combination thereof.

In addition, the method for separating payment transactional data from payment information data may further comprise detecting an explicit or implicit communication with the company or merchant and also determining the relationship according to the explicit or implicit communication. The implicit communication may be performed through the Internet, including email, posting on a web page, posting on a blog, posting on a chat room, visiting a web page or an IM (instant messenger) message. The detection of the explicit or implicit communication may comprise determining an active transmission coefficient for active transfer of information and/or determining an intrinsic transmission coefficient for passive transfer of information. The transaction may have a long decision cycle or a short decision cycle.

In addition, the method for separating payment transactional data from payment information data may further comprise determining a plurality of relationships, constructing a social group from said plurality of relationships, and constructing a social network from the social group. Alternatively, a social network may be constructed from the plurality of relationships. Further, a plurality of social networks may be overlaid to establish a new social network according to a similarity threshold. Also, the method may determine an influence in the relationships, wherein the influence may be active and/or passive, determine a strength of the relationship, and selecting a preferred mode of influence from active or passive according to the strength of said relationship.

In another embodiment, there is disclosed a method for identifying a specific cardholder by using the suffix of n digits from the cardholder's credit card number.

In another embodiment, there is disclosed a method for confirming offline purchases of a cardholder by using the suffix of n digits from the cardholder's credit card number.

The foregoing detailed description and accompanying drawings have been provided by way of explanation and illustration, and are not intended to limit the scope of the appended claims. Many variations in the presently preferred embodiments illustrated herein will be obvious to one of ordinary skill in the art, and remain within the scope of the appended claims and their equivalents.

The invention claimed is:

1. A computerized data processing system for using a credit card number suffix associated with a cardholder to build an updated data structure of aggregated transaction data that supports execution of cardholder search queries based on a variable length input credit card number suffix, the computerized data processing system comprising a data processor and non-transitory computer readable memory including program code, the program code being executed by the data processor to cause the computerized data processing system to:
   access a data structure of aggregated transaction data received from a plurality of different data collection mechanisms including merchant processors, acquiring banks, issuing banks, retailer direct feeds, and credit card networks;
   receive the credit card number suffix associated with the cardholder and with multiple transactions of the aggregated transaction data, wherein the multiple transactions are associated with at least one transaction type;
   receive available transaction data for the cardholder;
   regenerate, based on the credit card number suffix associated with the cardholder, a set of possible valid credit card numbers for the cardholder that each contain the credit card number suffix associated with the cardholder and with the multiple transactions of the aggregated transaction data;
   extract from the received available transaction data same type transaction data based on the at least one transaction type;
   concatenate the same type transaction data with the regenerated set of possible valid credit card numbers for the cardholder to form concatenated credit card numbers;
   map the concatenated credit card numbers to one or more indices of a hash table, wherein the mapping is prioritized toward indices associated with real transactions;
   store, in the data structure of aggregated transaction data at locations corresponding to the one or more indices, the received available transaction data and a weight value associated with the received available transaction data;
   learn by a pattern recognition algorithm, via the data processor, using the variable length input credit card number suffix and at least one of an email address, birthdate, name on card, address, or zip code;
   determine if the received available transaction data is already in the data structure of aggregated transaction data at the locations corresponding to the one or more indices;
   if the received available transaction data is already in the data structure of aggregated transaction data at the locations corresponding to one of the indices, identify an indices-based cardholder identifier associated with such locations and associate the indices-based cardholder identifier with the received credit card number suffix associated with the cardholder and with the multiple transactions; and
   if the received available transaction data is not already in the data structure of aggregated transaction data at the locations corresponding to one of the indices, modify the data structure of aggregated transaction data to create the updated data structure by performing the following:
      applying the pattern recognition algorithm to the data structure of aggregated transaction data to identify a most similar data record;
      updating the data structure of aggregated transaction data to add transaction data that was not already in the data structure of aggregated transaction data;
      updating the weight value associated with the stored received available transaction data at least in part using the pattern recognition algorithm;
      identifying a similarity-based cardholder identifier associated with the most similar data record and associating the similarity-based cardholder identifier with the credit card number suffix associated with the cardholder and with the multiple transactions of the aggregated transaction data by applying the pattern recognition algorithm using the aggregated transaction data at the locations corresponding to one of the indices; and
      updating the pattern recognition algorithm using the updated data structure of aggregated transaction data as a training set.

2. The computerized data processing system of claim 1, wherein the most similar data record is identified, by the data processor, using a cosine function.

3. The computerized data processing system of claim 1, wherein the pattern recognition algorithm, includes at least one of unsupervised learning, supervised learning, semi-supervised learning, reinforcement learning, association rules learning, Bayesian learning, or solving for probabilistic graphical models.

4. The computerized data processing system of claim 3, wherein the pattern recognition algorithm is an unsupervised learning algorithm, a supervised learning algorithm, a semi-supervised learning algorithm, a reinforcement learning algorithm, an association rules learning algorithm, a Bayesian learning algorithm, or an algorithm for solving for probabilistic graphical models.

5. The computerized data processing system of claim 1, wherein the data structure of aggregated transaction data defines cardholder profiles comprising a hashing representation of a credit card number and one or more of cardholder email, start date, end date, registration data, birthdate, name on card, first activity date, last activity date, card type, address, city, state, zip code, and country code.

6. The computerized data processing system of claim 1, wherein the data structure of aggregated transaction data defines cardholder profiles that describe a cardholder buying fingerprint.

7. The computerized data processing system of claim 1, wherein the data structure of aggregated transaction data defines cardholder profiles and further defines a social network among the cardholder profiles.

8. The computerized data processing system of claim 1, wherein the non-transitory computer readable memory and program code, with the data processor, cause the computerized data processing system to:
  apply data clustering strategies and pattern recognition algorithms to the data structure of aggregated transaction data to classify a plurality of cardholder identifiers into clusters based on the aggregated transaction data;
  create a buying fingerprint for each of the plurality of cardholder identifiers based on the aggregated transaction data and on the clusters; and
  store the buying fingerprint in the data structure of aggregated transaction data associated with each of the plurality of cardholder identifiers.

9. A method for using a credit card number suffix associated with a cardholder to build an updated data structure of aggregated transaction data that supports execution of cardholder search queries based on a variable length input credit card number suffix with a computerized data processing system, wherein the computerized data processing system comprises a data processor and non-transitory computer readable memory, the method comprising:
  accessing a data structure of aggregated transaction data received from a plurality of different data collection mechanisms including merchant processors, acquiring banks, issuing banks, retailer direct feeds, and credit card networks;
  receiving the credit card number suffix associated with the cardholder and with multiple transactions of the aggregated transaction data, wherein the multiple transactions are associated with at least one transaction type;
  receiving available transaction data for the cardholder;
  regenerating, based on the credit card number suffix associated with the cardholder and with the data processor, a set of possible valid credit card numbers for the cardholder that each contain the credit card number suffix associated with the cardholder and with the multiple transactions of the aggregated transaction data;
  extracting from the received available transaction data, using the data processor, same type transaction data based on the at least one transaction type;
  concatenating, with the data processor, the same type transaction data with the regenerated set of possible valid credit card numbers for the cardholder to form concatenated credit card numbers; and
  applying, with the data processor, a hash function to the concatenated credit card numbers to create one or more indices;
  storing, in the data structure of aggregated transaction data at locations corresponding to the one or more indices, the received available transaction data and a weight value associated with the received available transaction data;
  learning by a pattern recognition algorithm, via the data processor, using the variable length input credit card number suffix and at least one of an email address, birthdate, name on card, address, or zip code;
  determining, with the data processor, if the received available transaction data is already in the data structure of aggregated transaction data at locations corresponding to the one or more indices;
  in an instance when the received available transaction data is determined to be already in the data structure of aggregated transaction data at locations corresponding to the one or more indices, identifying an indices-based cardholder identifier associated with such locations and associating the indices-based cardholder identifier with the received credit card number suffix associated with the cardholder and with the multiple transactions;
  in an instance when the received available transaction data is determined to be not already in the data structure of aggregated transaction data at locations corresponding to the one or more indices, modifying the data structure of aggregated transaction data to create the updated data structure by performing the following:
    applying, with the data processor, the pattern recognition algorithm to the data structure of aggregated transaction data to identify a most similar data record;
    updating the data structure of aggregated transaction data to add transaction data that was not already in the data structure of aggregated transaction data; and
    updating the weight value associated with the stored received available transaction data at least in part using the pattern recognition algorithm;
    identifying a similarity-based cardholder identifier associated with the most similar data record and associating the similarity-based cardholder identifier with the credit card number suffix associated with the cardholder and with the multiple transactions of the aggregated transaction data by applying the pattern recognition algorithm using the aggregated transaction data at the locations corresponding to one of the indices; and
    updating the pattern recognition algorithm using the updated data structure of aggregated transaction data as a training set.

10. The method of claim 9, wherein the most similar data record is identified, by the data processor, using a cosine function.

11. The method of claim 9, wherein the pattern recognition algorithm includes at least one of unsupervised learning, supervised learning, semi-supervised learning, reinforcement learning, association rules learning, Bayesian learning, or solving for probabilistic graphical models.

12. The method of claim 11, wherein the pattern recognition algorithm is an unsupervised learning algorithm, a supervised learning algorithm, a semi-supervised learning algorithm, a reinforcement learning algorithm, an association rules learning algorithm, a Bayesian learning algorithm, or an algorithm for solving for probabilistic graphical models.

13. The method of claim 9, wherein the data structure of aggregated transaction data defines cardholder profiles comprising a hashing representation of a credit card number and one or more of cardholder email, start date, end date, registration data, birthdate, name on card, first activity date, last activity date, card type, address, city, state, zip code, and country code.

14. The method of claim 9, wherein the data structure of aggregated transaction data defines cardholder profiles that describe a cardholder buying fingerprint.

15. The method of claim 9, wherein the data structure of aggregated transaction data defines cardholder profiles and further defines a social network among the cardholder profiles.

16. The method of claim 9, wherein the non-transitory computer readable memory and program code, with the data processor, cause the computerized data processing system to:
- apply data clustering strategies and pattern recognition algorithms to the data structure of aggregated transaction data to classify a plurality of cardholder identifiers into clusters based on the aggregated transaction data;
- create a buying fingerprint for each of the plurality of cardholder identifiers based on the aggregated transaction data and on the clusters; and
- store the buying fingerprint in the data structure of aggregated transaction data associated with each of the plurality of cardholder identifiers.

\* \* \* \* \*

UNITED STATES PATENT AND TRADEMARK OFFICE
CERTIFICATE OF CORRECTION

| | |
|---|---|
| PATENT NO. | : 11,295,394 B2 |
| APPLICATION NO. | : 13/991807 |
| DATED | : April 5, 2022 |
| INVENTOR(S) | : Francisco Larrain et al. |

It is certified that error appears in the above-identified patent and that said Letters Patent is hereby corrected as shown below:

In the Drawings

Sheet 4 of 5, FIG. 4, and on the title page, the illustrative figure, reference numeral S404, Line 1, delete "CONTEPTS" and insert -- CONCEPTS --, therefor.

Sheet 5 of 5, FIG. 5, reference numeral 230, Line 2, delete "Processcrs" and insert -- Processors --, therefor.

Signed and Sealed this
Twenty-seventh Day of December, 2022

Katherine Kelly Vidal
*Director of the United States Patent and Trademark Office*